United States Patent

Mikkelsen

[11] Patent Number: 5,614,965
[45] Date of Patent: Mar. 25, 1997

[54] SPECTACLE FRAMES

[75] Inventor: Jørgen V. Mikkelsen, Århus, Denmark

[73] Assignee: Pro Design International A/S, Arhus C, Denmark

[21] Appl. No.: 455,564

[22] Filed: May 31, 1995

[30] Foreign Application Priority Data

May 31, 1994 [DK] Denmark ................................. 0612/94

[51] Int. Cl.⁶ ............................... G02C 1/08; G02C 5/00
[52] U.S. Cl. ................................... 351/101; 351/149
[58] Field of Search ................... 359/41, 90, 93, 359/97, 99, 100, 101, 105, 108, 140, 149, 158, 121

[56] References Cited

U.S. PATENT DOCUMENTS 1,987,702  1/1935  Nerney ............................ 351/108
2,947,024  8/1960  Czudak, Jr. ...................... 351/121

FOREIGN PATENT DOCUMENTS 2199155  6/1988  United Kingdom ................. 351/90

Primary Examiner—Huy Mai
Attorney, Agent, or Firm—Antonelli, Terry, Stout & Kraus, LLP

[57] ABSTRACT

In spectacle frames having exchangeable edge bars (10) of the type that by one end is fastened by an engagement with the bridge (2) the edge bar is retained at its far end by a fixing member (16) in the form of a pin or rivet cooperating with a hole, said fixing member being subject to a snap lock effect. The edge bar can thereby be instantly replaced without needing any tools.

4 Claims, 1 Drawing Sheet

SPECTACLE FRAMES

FIELD OF THE INVENTION

The present invention relates to a spectacle frame having exchangeable edge rims of the type that by one end is retained in engagement with the bridge and is secured at the other end with a fixing member in the hinge fastening of the spectacle frame.

BACKGROUND AND SUMMARY OF INVENTION

The invention specifically relates to the type that has a bar above each lens frame and where the inner end of the bar has a slot from the side. The bar end is retained by its slot gripping the bridge. At the other end the bars are secured by a screw that from above is screwed home into a threaded hole in the hinge fastenings. Ordinary screws having a flat head and finger screws, respectively, are used, the screw heads being a feature of the spectacles. The edge bars having ordinary screws are awkward to mount and dismount and a special, very small screw driver is required in order to perform the exchange after all, and very few people possesses such screw driver. The finger screws suffer from the severe drawback that despite their relatively large heads, which in addition have grooves, they are difficult to tighten sufficiently. They therefore show a tendency to work themselves loose for which reason they are often re-tightened by a screw driver despite their true purpose. This renders their exchange just as difficult as when ordinary screws are used.

This problem of a secure fixing and easy replacement is solved according to the invention by a fixing member in the form of a pin retained in its hole by a snap lock effect. The pin is preferably fastened at the outer end of the edge bar and is inserted down into a hole in the hinge fastenings or a separate hole portion. However, the pin might just as well be in the spectacle frame and the hole be in the edge bar.

An embodiment of the invention shall be described in further detail in the following with reference to the drawing.

BRIEF DESCRIPTION OF THE DRAWING

The drawing is a front elevation of a section of a pair of spectacles according to the invention 2 denotes the bridge between two lenses and 6 denotes the securing of the not illustrated hinge fastening of a bow to the lens.

DETAILED DESCRIPTION OF DISCLOSED EMBODIMENT

Figure 1:
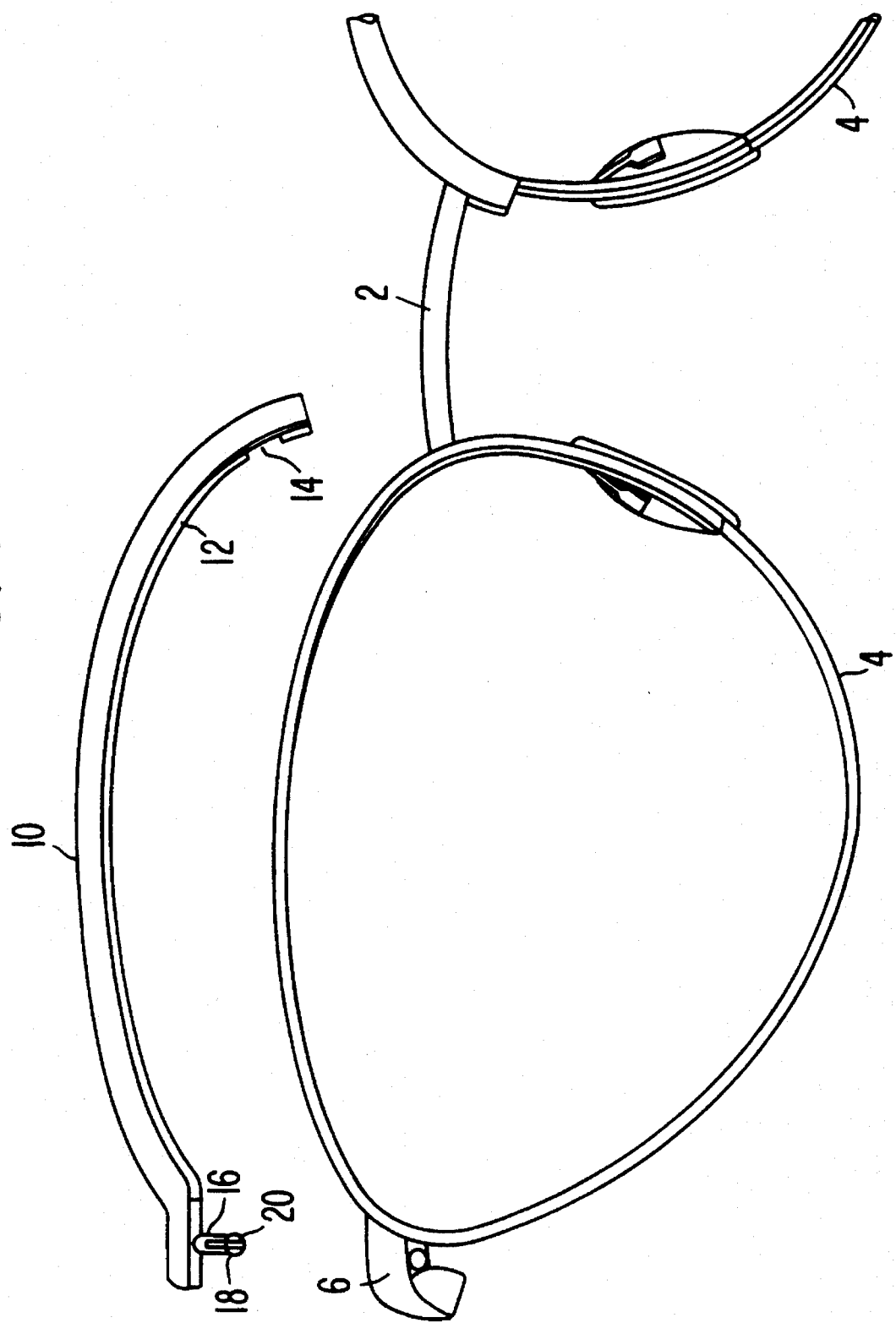

Referring now to the drawings, in the spectacles of FIG. 1 above the left lens frame 4 an edge bar 10 is shown The drawing is a front elevation of a section of a pair of ready for its attachment while the right one already is attached. There is a groove 12 in the lower rim of the edge bar, said groove gripping the frame 4 and hiding this. At the back on the inner end of the bar there is an incision 14 by which the end extends into and is retained at the bridge 2. In the outer end of the edge bar a pin or rivet 16 is fastened by an encompassing bead 18 at the end and the pin is furthermore slit 20 from the bottom into two or more resilient legs. At the attachment the pin is pressed down into a hole in the hinge fastening and is retained by the snap lock effect.

The edge bar is mounted by first fastening it to the incision in the bridge and then guide it over the frame and eventually press the pin home into the hole. As a consequence of this the edge bar is unfailingly secured. On the other hand the bar can easily be dismounted by loosening the pin from the hole. For this purpose the end of the edge bar can extend negligibly beyond the hinge fastening or be turned slightly upward from this to facilitate its being caught by the owner's nail and the edge bar being tipped up.

It is obvious to specialists that a snap lock connection can have several embodiments. This concerns the pin as well as the design of the hole. The pin can have several beads, rounded or triangular and the hole can have corresponding grooves that cooperate with the protrusions on the pin. The pin may also be inserted protruding downwardly through the hole such that a bead engages the edge of the hole.

The invention thus provides a pair of spectacles with exchangeable edge bars which are securely fastened as well as being easy to exchange without using tools.

I claim:

1. A spectacle frame for a pair of spectacles with edge bars that are exchangeable without using tools for covering top portions of the frame, said spectacle frame comprising a pair of lens frames connected by a bridge, each of said lens frames comprising a hinge fastening for fastening a bow to the lens frame and a top portion of the lens frame for extending along an upper edge of an associated lens between said bridge and said hinge fastening, and a pair of edge bars for covering respective ones of said top portions of said lens frames, said edge bars each comprising at one end thereof means for engaging said bridge and at the other end thereof means for forming a snap lock connection with an associated lens frame so that the edge bar can be mounted by first fastening it to the bridge at said one end and guiding it over the top portion of the associated lens frame and pressing said other end against said lens frame for forming said snap lock connection.

2. The spectacle frame according to claim 1, wherein said means for forming a snap lock connection with the associated lens frame comprises a fixing member in the form of a pin fastened at said other end of said edge bar, said fixing member cooperating with a hole in said lens frame for making said snap lock connection.

3. The spectacle frame according to claim 2, wherein said fixing member comprises at least an encompassing bead for engagement with the side wall of said hole.

4. The spectacle frame according to claim 2, wherein said fixing member is slit from the end into resilient legs.

* * * * *